US008141836B2

(12) United States Patent  
Saez et al.

(10) Patent No.: US 8,141,836 B2
(45) Date of Patent: Mar. 27, 2012

(54) ADJUSTABLE COMPUTER COMPONENT MOUNTING SYSTEM

(75) Inventors: Manuel Saez, Brooklyn, NY (US); Stefan Spoerl, New York, NY (US); Kim ten Hacken, Brooklyn, NY (US); Lachezar Tsvetanov, Stamford, CT (US)

(73) Assignee: Humanscale Corporation, New York, NY (US)

( * ) Notice: Subject to any disclaimer, the term of this patent is extended or adjusted under 35 U.S.C. 154(b) by 1210 days.

(21) Appl. No.: 11/690,568

(22) Filed: Mar. 23, 2007

(65) Prior Publication Data

US 2008/0234856 A1 Sep. 25, 2008

(51) Int. Cl.
*A47H 1/10* (2006.01)
(52) U.S. Cl. .............. 248/317; 248/295.11; 248/297.21; 248/918; 248/924
(58) Field of Classification Search .................. 248/317, 248/229.12, 229.14, 229.22, 229.24, 295.11, 248/297.21, 298.1, 309.1, 316.1, 316.4, 316.6, 248/327, 637, 674, 918, 924
See application file for complete search history.

(56) References Cited

U.S. PATENT DOCUMENTS

| 4,466,629 | A |   | 8/1984 | Sinyard |
| 5,683,066 | A | * | 11/1997 | McCann .................. 248/295.11 |
| 5,927,668 | A |   | 7/1999 | Cyrell |
| 5,961,084 | A |   | 10/1999 | Brand et al. |
| 6,098,944 | A | * | 8/2000 | Pangborn et al. .............. 248/317 |
| 6,340,145 | B1 |  | 1/2002 | Tagami et al. |
| 6,402,111 | B1 |  | 6/2002 | Stewart et al. |
| 6,460,817 | B1 |  | 10/2002 | Bosson |
| 6,986,491 | B2 |  | 1/2006 | Anderson |
| 7,607,625 | B2 | * | 10/2009 | Wang ......................... 248/309.1 |

FOREIGN PATENT DOCUMENTS

| JP | 3520143 | 11/1933 |
| JP | 2000163156 | 6/2000 |
| JP | 2003312562 | 11/2003 |

OTHER PUBLICATIONS

International Preliminary Report on Patentability by the International Preliminary Examining Authority—US for PCT Application No. PCT/US2007/64827 issued on Jun. 8, 2009.
PCT/US2007/064827—Adjustable Computer Component Mounting System—US as International Searching Authority—Search Report and Written Opinion dated Aug. 18, 2008.

* cited by examiner

*Primary Examiner* — Anita M King
(74) *Attorney, Agent, or Firm* — Jones, Walker, Waechter, Poitevent, Carrere & Denegre, LLP (57) ABSTRACT

An adjustable system for mounting a computer component to a surface, including an adjustable horizontal assembly with swiveling mounting structure and an adjustable vertical assembly featuring two sliding extrusions and a stopper wedge engaged with a long screw for efficient mounting of computer components within workplaces.

22 Claims, 8 Drawing Sheets

ADJUSTABLE COMPUTER COMPONENT MOUNTING SYSTEM

I. CROSS-REFERENCE TO RELATED APPLICATION

Not Applicable.

II. STATEMENT REGARDING FEDERALLY SPONSORED RESEARCH OR DEVELOPMENT

Not Applicable.

III. FIELD OF THE INVENTION

The present invention relates to an adjustable computer component mounting system.

IV. BACKGROUND OF THE INVENTION

Desktop computers are presently ubiquitous in businesses, schools, and households, and are used for a variety of different tasks, including performing office tasks, organizing digital photos, video editing and Internet access. Nearly all desktop computers are modular, with components that can easily be replaced or upgraded. In a typical configuration, desktop computers house central processing units and other main components within a case, also known as a computer chassis, cabinet, tower, box or housing. The computer case must be centrally located relative to other components, but may be bulky or intrusive within a workspace. Therefore, as furniture designers and manufacturers adapt office and office-like furniture to meet the demands of these types of modular systems, computer components, especially computer cases, increasingly are positioned within the workspace in a location that allows easy access for components while also allowing for minimum workspace intrusion.

One approach has been to develop systems for mounting computer components to the underside of a desktop. In one such system, mounting brackets may be fixed in position underneath the desk to hold the component. In this type of system, there may be limited access to many areas of the component. If the mounting brackets are allowed to rotate underneath the desktop, additional space may be required to allow for the rotation. Moreover, because computer components often are bulky and heavy, it is crucial that the component is held as securely and safely as possible in position. Therefore, because computer components may vary in dimension and weight from manufacturer or product line to another, positioning of the brackets such that the component is securely held may require extensive adjustment. Although some systems utilize both vertical and horizontal adjustments, typical systems utilize clamp plates and threaded engagement to perform adjustment. In situations where a high volume of computer components are to be installed or removed within a short amount of time, such traditional threaded systems require an extensive amount of labor and time to gain precise adjustment. It is therefore desirable to provide a computer component mounting system that implements horizontal and vertical adjustment for securing a computer component to the underneath of a desktop while requiring the least amount of energy and time to do so, while allowing for complete rotation for access to devices and peripheral components and still maintaining a space efficient workspace.

V. BRIEF DESCRIPTION OF THE INVENTION

In one embodiment, the present invention provides a computer component mounting system, comprising a vertical assembly which adjusts vertically to a first dimension of a computer component, the vertical assembly comprising an outer extrusion, an inner extrusion, the inner extrusion slidably engaged within the outer extrusion, a stopper means for substantially immobilizing the inner and outer extrusions relative to each other, and a base for stabilizing the computer component, the base rigidly attached to a distal end of the outer extrusion; and a mounting means to secure the computer component mounting system to a surface, the mounting means attached to the vertical assembly.

In another embodiment, the present invention provides as a stopper means a wedge, the wedge operably engaged between the inner and outer extrusions, and a long screw, the long screw having a first end and a second end and being threadably engaged with the wedge at the first end, such that when the long screw is turned in a first direction, the wedge moves upward and lodges between the inner and outer extrusions to substantially immobilize the inner and outer extrusions relative to each other, and when the long screw is turned in a second direction, the wedge moves downward and dislodges to allow the inner and outer extrusions to slide relative to each other.

In yet another embodiment, the present invention further includes a handle connected to the second end of the long screw to facilitate turning the long screw.

In one embodiment, the present invention includes a horizontal assembly which adjusts horizontally to a second dimension of the computer component.

In yet another embodiment, the present invention includes a horizontal assembly which comprises a horizontal platform, a slider grip assembly, and a swivel knob, wherein the swivel knob operably engages the horizontal platform and the slider grip assembly such that the slider grip assembly may be adjusted outwardly and inwardly from the horizontal platform to engage at least one surface of the computer component.

In another embodiment, the present invention includes a slider grip assembly which comprises a slider platform operably engaged with a gripping edge such that the gripping edge protrudes perpendicularly from the slider platform and slides outwardly and inwardly relative to the horizontal platform to engage a surface of the computer component.

In still other embodiments, the present invention includes a slider grip assembly which further comprises a clamp plate assembly, the clamp plate assembly operably engaged with the slider platform and the swivel knob such that turning the swivel knob in a first direction lowers and removably compresses the clamp plate assembly against the proximate surface of the computer component while simultaneously substantially immobilizing the slider platform and the horizontal platform relative to each other such that the gripping edge removably engages the surface of the computer component.

In other embodiments, the present invention includes a clamp plate assembly which comprises at least one elastomer layer to removably compress against the proximate surface of the computer component.

In some embodiments, the present invention includes a slider platform which comprises a slot, wherein the horizontal platform comprises a slot, wherein the swivel knob comprises a rod and a knob handle engaged with a first end of the rod, wherein a second end of the rod inserts through the slot in the horizontal platform, through the slot in the slider platform and engages with the clamp plate assembly.

In still other embodiments, the present invention includes a rod which is operably engaged within the slot of the slider platform and the slot of the horizontal platform such that the rod may slide the length of the slot of the slider platform to adjust the horizontal assembly to the second dimension of the computer component.

In some embodiments, the present invention includes a mounting means which comprises a swivel guide plate engaged with the horizontal assembly, the swivel guide plate adapted for mounting upon a mounting track on a surface.

In yet other embodiments, the present invention includes a swivel guide plate which comprises a slot, and wherein the rod of the swivel knob inserts through the slot and engages the horizontal assembly.

In some embodiments, the present invention includes a long screw which operably engages the horizontal platform such that the horizontal assembly and the vertical assembly operate as an integrated unit.

In some embodiments, the present invention includes a long screw which operably engages the horizontal platform at a position near the swivel knob.

In other embodiments, the present invention includes an inner extrusion which comprises a distal end, an outer extrusion which comprises a distal end, a horizontal assembly which is rigidly attached to the distal end of the inner extrusion and the base comprises a second horizontal assembly rigidly attached to the distal end of the outer extrusion and adapted to adjust horizontally to the same dimension of the computer component, such that the computer component is engaged on three surfaces by the horizontal assembly, the vertical assembly and the second horizontal assembly, respectively.

In some embodiments, the present invention includes a mounting means which comprises a swivel guide plate engaged with the horizontal assembly, the swivel guide plate adapted for mounting upon a mounting track on a surface.

In yet other embodiments, the present invention includes a mounting means which comprises a swivel guide plate engaged with the vertical assembly, the swivel guide plate adapted for mounting upon a mounting track on a surface.

In some embodiments, the present invention includes a lock to secure the computer component within a computer component mounting system.

In yet other embodiments, the present invention encompasses a method for installing a computer component in a mounting system comprising the steps of (a) loosening a swivel knob; (b) sliding the slider grip assembly outward to a dimension longer than a first dimension of the computer component; (c) releasing a stopper means; (d) sliding the inner extrusion upward to a dimension greater than a second dimension of the computer component; (e) placing a computer component with one surface upon a base, the base rigidly engaged with a distal end of the outer extrusion to stabilize the computer component; (f) lowering the inner extrusion relative to the base until the horizontal platform engages a proximate surface of the computer component; (g) tightening the stopper means; (h) sliding the slider grip assembly inward to engage a forward surface of the computer component; (i) tightening the swivel knob to secure the computer component within the mounting system; (j) securing the swivel guide plate onto the mounted rail. Other embodiments of a method for installing may include a swivel knob which operably engages a horizontal platform and a slider grip assembly such that loosening the swivel knob permits the slider grip assembly to slide outward from the horizontal platform. Yet other embodiments of a method for installing a computer component may include a stopper means which comprises a wedge, the wedge operably engaged between an inner extrusion and an outer extrusion, and a long screw, the long screw threadably engaged with the wedge. Some embodiments of a method for installing a computer component may include a stopper means which may be tightened by turning the long screw clockwise to lodge the wedge between the inner and outer extrusions. Another embodiment of a method for installing a computer component may include the step of centering a swivel guide plate above the computer component, the swivel guide plate operably engaged with the horizontal platform and comprising one or more flanges for sliding along a mounted rail.

The above description of the present invention is not intended to describe each illustrated embodiment or every possible implementation of the present invention. The figures and the detailed description which follow, however, do particularly exemplify these embodiments.

VI. BRIEF DESCRIPTION OF THE DRAWINGS

In consideration of the following detailed description of various embodiments, the invention may be more completely understood in connection with the following drawings.

FIGS. 9(a-b) are perspective views of an embodiment of the present invention in operation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

VII. DETAILED DESCRIPTION OF THE DESCRIBED EMBODIMENTS

The present invention relates generally to a computer component mounting system comprising a horizontal assembly, including a mounting structure, and a vertical assembly. As used herein, the term "computer component" means any generally rectangular component used within a user's workspace, including cases, cabinets, chassis, towers, boxes or holders for containing central processing units, monitors, speakers, docking stations, laptops, stereo receivers, simple containers, and the like. Although the term "desk" may be used herein to describe a surface to which a computer component may be mounted, it should be appreciated that the computer component mounting system of the present invention may be mounted to any fixture, furniture or building component. Finally, although the term "horizontal" may be used herein to mean of or relating to or situated near the horizon, and "vertical" may be used herein to mean perpendicular to the plane of the horizon, these terms may be understood throughout to represent any two planes in space perpendicular to each other, without reference to the horizon.

Figure 1:
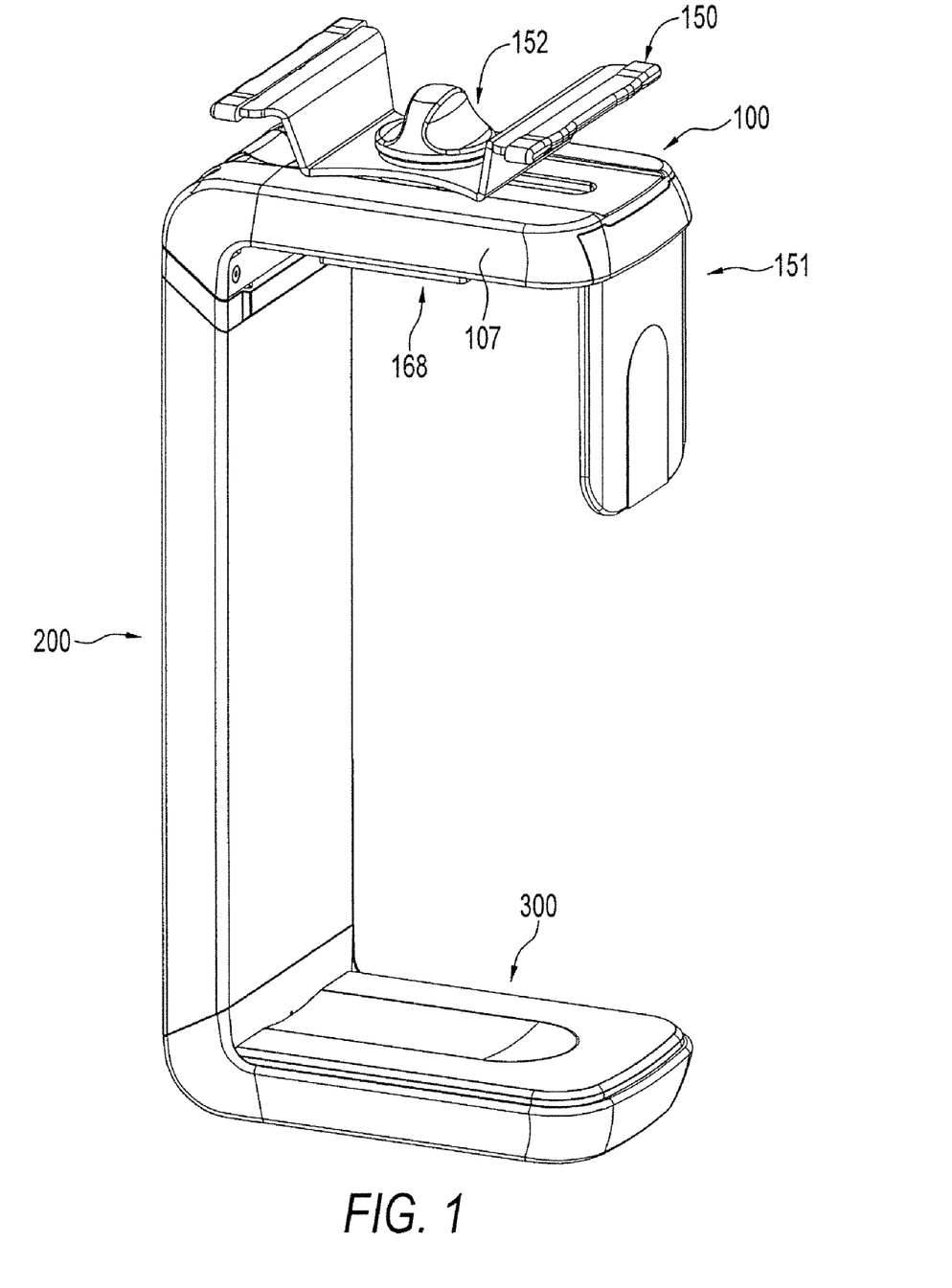
FIG. 1 is a perspective view of an embodiment of the present invention.
Figure 2:
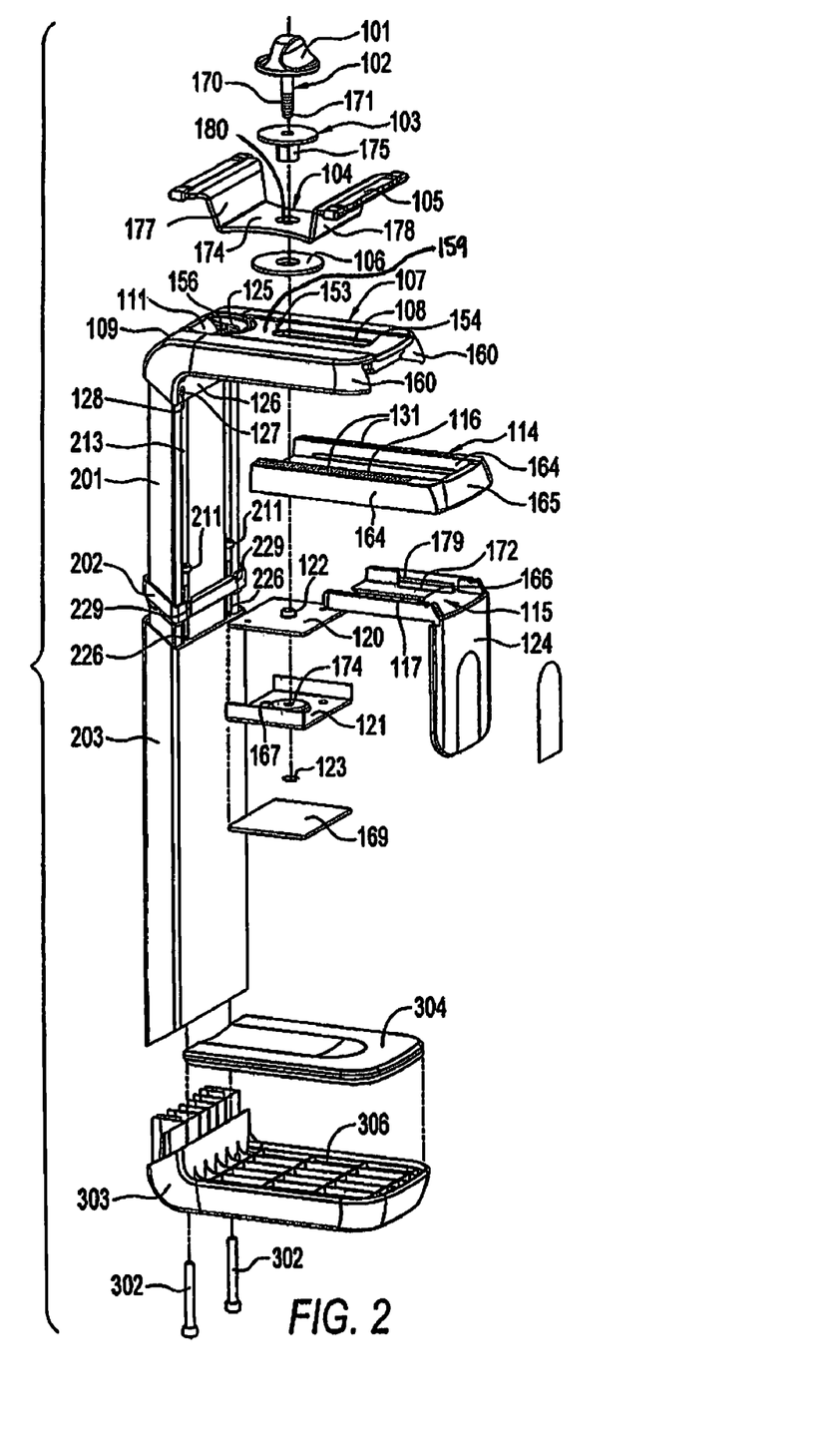
FIG. 2 is an exploded view of an embodiment of the present invention.
Figure 3:
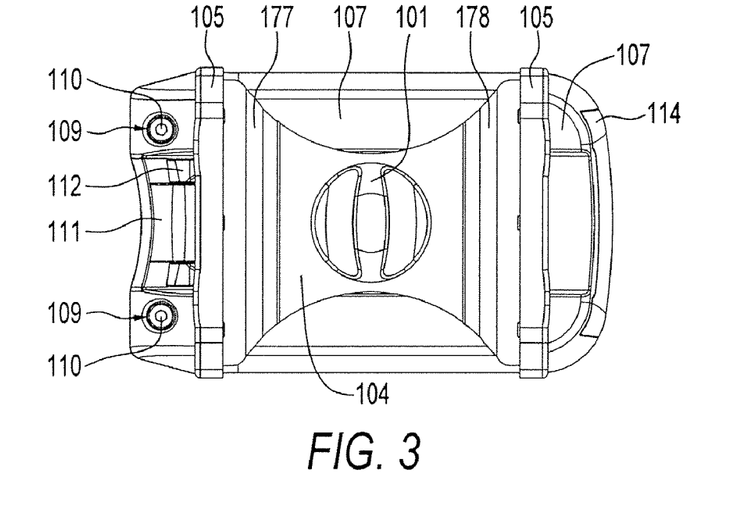
FIG. 3 is a top view of an embodiment of the present invention.

An embodiment of the present invention is generally illustrated in FIG. 1. A computer component mounting system includes horizontal assembly 100 and vertical assembly 200. Horizontal assembly 100 includes horizontal platform 107, swivel knob assembly 152, slider grip assembly 151, clamp plate assembly 168 and mounting structure 150. As better shown in the embodiment of FIG. 2, horizontal platform 107 comprises a substantially rectangular portion 159 and opposing sides 160 descending from rectangular portion 159. Rectangular portion 159 includes an elongated slot 108, which preferably extends lengthwise along the centerline of horizontal platform 107 with length preferably about 74 millimeters (74 mm) and with width preferably about 13.5 millimeters (13.5 mm) such that slot 108 may accommodate a screw, rod or other cylindrical item (including swivel washer 103) in sliding operation between its ends 153, 154. Slot length may range from about 15 millimeters (15 mm) to about 100 millimeters (100 mm). The shorter the slot length, the less adjustment in the horizontal direction may be accomplished. When the slot length approaches the maximum, some stability of horizontal platform 107 may be lost. Horizontal platform 107 further includes a rearward recessed portion 156 for storage of handle 125, and rearward bores 109. As shown in the embodiment of FIG. 3, screws 110 operably engage bores 109 for attachment of horizontal platform 107 to vertical assembly 200, as described below. In some embodiments, as shown in FIG. 2, horizontal platform 107 may also include reinforcement plate 126, at least two reinforcement plate bores 128, and at least two reinforcement plate screws 127. Screws 127 operably engage bores 128 for attachment of reinforcement plate 126 to horizontal platform 107.

Figure 6A:
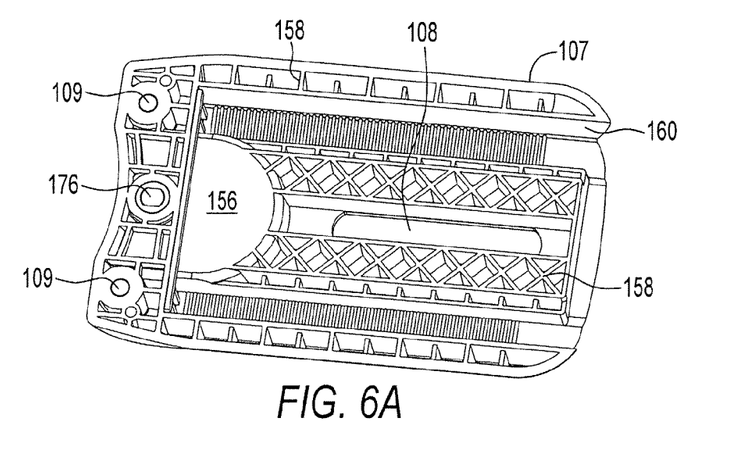
FIG. 6(a) is a bottom view of an embodiment of a horizontal platform of the present invention.

Referring to the embodiment shown in FIG. 6(a), horizontal platform 107 may include a plurality of internal ribs 158 that may facilitate the molding of platform 107 and provide sufficient structural strength. As best shown in the embodiment of FIG. 1, the bottom surface of horizontal platform 107 accommodates slider grip assembly 151 in order to adjust horizontal assembly 100 to a dimension of a computer component.

Figure 6B:
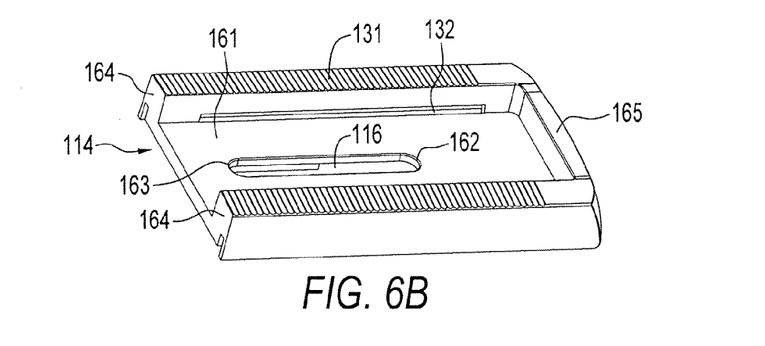
FIGS. 6(b)-(c) are perspective views of an embodiment of a slider grip assembly of the present invention.
Figure 6C:
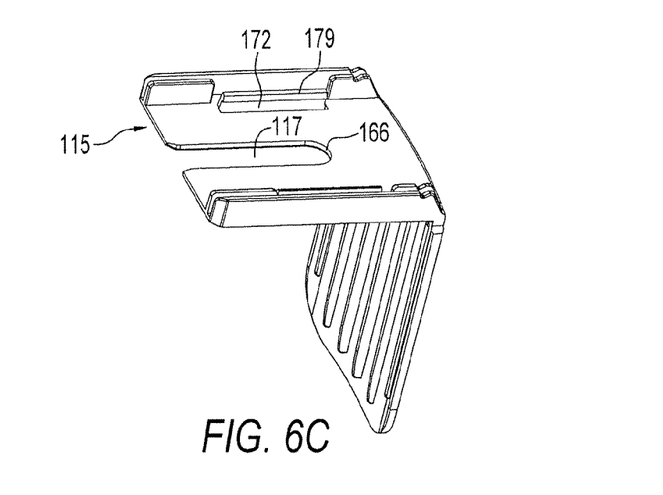

Referring now to the embodiment shown in FIG. 6(b), slider grip assembly 151 includes slider platform 114 and gripping platform 115. Slider platform 114 comprises a substantially rectangular portion 161 with an elongated slot 116, two opposing raised edges 164 and front lip 165. Slot 116 preferably extends lengthwise along the centerline of the platform 114 with length preferably about 71.5 millimeters (71.5 mm) and with width preferably about 10 millimeters (10 mm) such that slot 116 may accommodate a screw, rod or other cylindrical item (including walled bore 122) in sliding operation between its ends 162, 163. Opposing raised edges 164 include a plurality of ridges 131 for operably engaging the bottom surface of horizontal platform 107. Opposing raised edges 164 also include lengthwise slots 132 for engagement with gripping platform 115. Gripping platform 115 includes elongated open slot 117 and lengthwise slots 172 with raised hooked edges 179 for operably engaging slots 132 of slider platform 114. Open slot 117 preferably extends rearward along the centerline of platform 115 with length preferably about 59 millimeters (59 mm) and with width preferably about 14 millimeters (14 mm) such that slot 117 may accommodate a screw or rod in sliding operation between its end 166 and the rearward edge of platform 115. The forward side of gripping platform 115 descends to form gripping edge 124. Gripping edge 124 is preferably shaped to allow for a user to use one hand to grasp gripping edge 124 in order to adjust slider grip assembly 151 of horizontal assembly 100 to the dimension of a computer component. In order to assemble slider grip assembly 151, gripping platform 115 and slider platform 114 may be fitted together by snapping edges 179 into slots 132 (shown assembled in FIG. 3).

Referring again to the embodiment shown in FIG. 2, clamp plate assembly 168 comprises top slider plate 120 and base slider plate 121, which are similarly proportioned thin plates fitting together such that they may operate in unison. Top slider plate 120 includes threaded walled bore 122. Threaded walled bore 122 is adapted to slide within slot 116 of slider platform 114 and within slot 117 of gripping platform 115, and operably engages threading 170 on swivel knob rod 102. Base slider plate 121 includes recessed portion 167 with bore 174, which is adapted to engage swivel knob rod 102. Clamp plate assembly 168 further includes foam layer 169, which may be attached to the bottom surface of base slider plate 121 such that a computer component may be protected and cushioned when clamp plate assembly 168 compresses to its surface. Any type of elastomer or rubberlike substance known in the art that would protect the computer component from the mounting system may be used for foam layer 169, including commercially available polyurethane foam. Clamp plate assembly 168 may be assembled by aligning walled bore 122 of top slider plate 120, with wall portion upward, and bore 174 of base slider plate 121, with recessed portion 167 concave to the bottom surface of base slider plate 121. In this manner, top slider plate 120 nestles within base slider plate 121. Foam layer 169 may be applied to the bottom surface of base slider plate 121 by any means known in the art, as described below. An embodiment of clamp plate assembly 168 assembled with horizontal assembly 100 is shown in FIG. 8.

Figure 7:
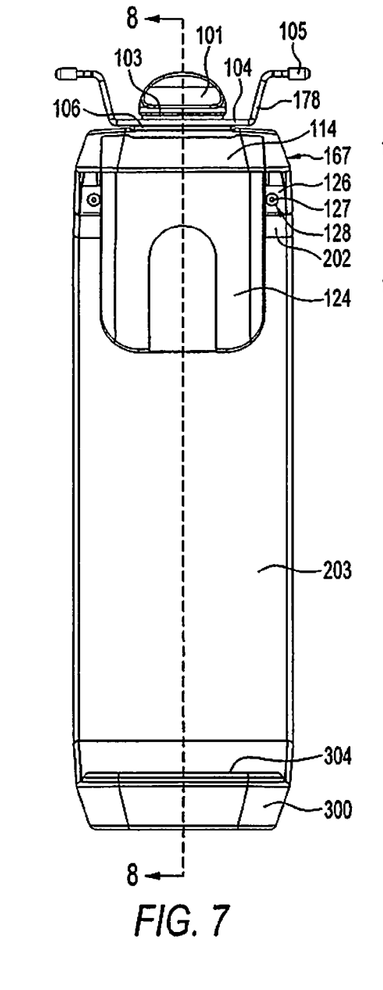
FIG. 7 is a front view of an embodiment of an embodiment of the present invention.
Figure 8:
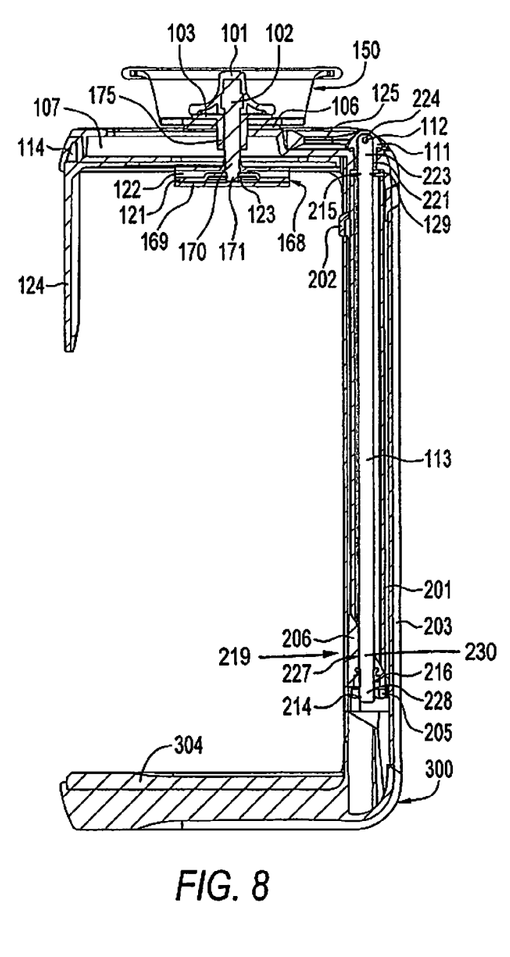
FIG. 8 is a cross-sectional view of an embodiment of the present invention.

Referring to the embodiment shown in FIGS. 7 and 8, swivel knob assembly 152 (shown in FIG. 1) includes swivel knob 101, swivel knob rod 102 and swivel washer 103. Swivel knob 101 preferably is adapted to be grasped and turned by a user, and rigidly attaches to swivel knob rod 102 in any manner known in the art. Swivel knob rod 102 is a long cylindrical rod with end 171 adapted to snap to an e-style retaining ring or other retaining component, as is well known in the art, and includes threading 170 for engagement with threaded walled bore 122 of top slider plate 120. Swivel washer 103 is adapted to operably engage swivel knob rod 102 and may include an extended longitudinal portion 175 adapted to operably engage slot 108 of horizontal platform 107 and washer 106 of mounting structure 150.

Referring still to the embodiment shown in FIGS. 7 and 8, mounting structure 150 includes swivel guide plate 104, swivel guide plate overmold 105 and washer 106. Swivel guide plate 104 may be adapted for operable engagement with commercially available mounting brackets or tracks, as is well known in the art. Swivel guide plate 104 comprises two wings 177, 178 ascending from a substantially flat plate. Swivel guide plate 104 also includes a bore 180 (shown in FIG. 2) adapted to operably engage longitudinal portion 175 of swivel knob washer 103. Swivel guide plate overmold 105, preferably constructed from metal and plastic, including stamped cold rolled steel, powder coated, and acetal copolymer overmold, covers the edges of wings 177, 178 to protect the surface to which mounting structure 150 is to be attached.

Washer 106 also is adapted to operably engage longitudinal portion 175 of swivel knob washer 103.

Referring to the embodiment shown in FIGS. 7 and 8, in order to assemble horizontal assembly 100, swivel knob rod 102 inserts into swivel washer 103. Longitudinal portion 175 of swivel washer 103 then inserts through bore 180 of swivel guide plate 104, through washer 106, and through slot 108 of horizontal platform 107. Walled bore 122 of top slider plate 120 then inserts upward through slot 117 and slot 116 of slider grip assembly 151. Swivel knob rod 102 operably engages threaded walled bore 122 with threading 170. End 171 of swivel knob rod 102 then inserts through bore 174 of base slider plate and fixedly engages with e-style retaining ring 123, or any other type of snap ring or retaining component. Foam layer 169 attaches in any manner known in the art, including adhesive, pins and the like, to the bottom surface of base slider plate 121 to protect a computer component from base slider plate 121, end 171 of swivel knob rod 102, and e-style retaining ring 123. As a user turns swivel knob 101 clockwise, swivel knob rod 102 lowers clamp plate assembly 168 until foam layer 169 engages the surface of the computer component, lowering base slider plate 121 and raising top slider plate to tighten the slider grip assembly 151. Similarly, when a user turns swivel knob 101 counterclockwise, swivel knob rod 102 raises clamp plate assembly 168 from the surface of computer component and loosens the connection between slider grip assembly 151, horizontal platform 107 and clamp plate assembly 168. Gripping edge 124 then may be used to adjust the horizontal distance between gripping edge 124 and vertical assembly 200 by sliding forward and rearward. Swivel knob 101, swivel knob rod 102, swivel knob washer 103, top slider plate 120 and base slider plate 121 may move laterally in unison, confined within slot 108 of horizontal platform and slots 116, 117 of slider grip assembly 151. As assembled, mounting structure 150 may swivel 360 degrees around longitudinal portion 175 of swivel washer 103.

Figure 5A:
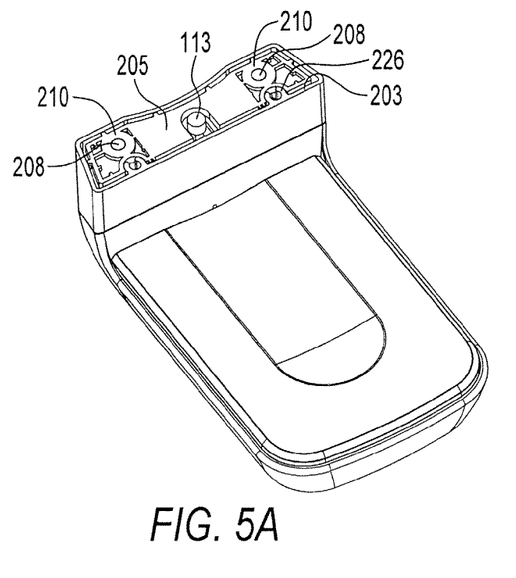
FIG. 5(a) is a cross-sectional view of an embodiment of a vertical assembly of the present invention.
Figure 5B:
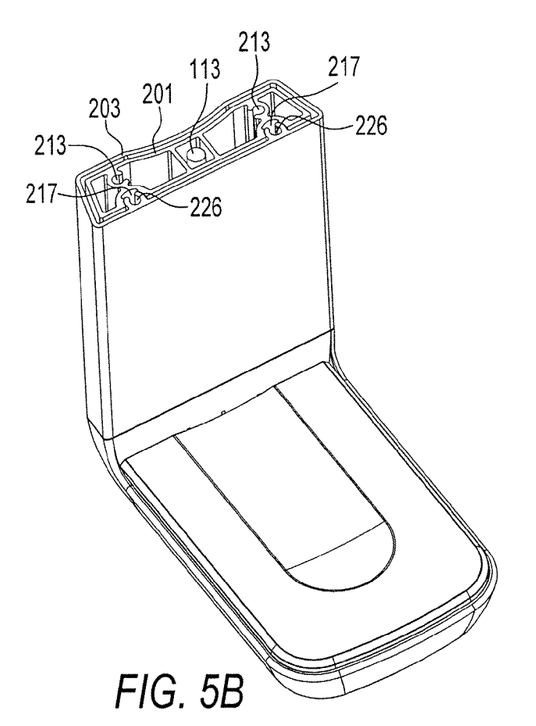
FIG. 5(b) is a cross-sectional view of an embodiment of inner and outer extrusions of the present invention.
Figure 5C:
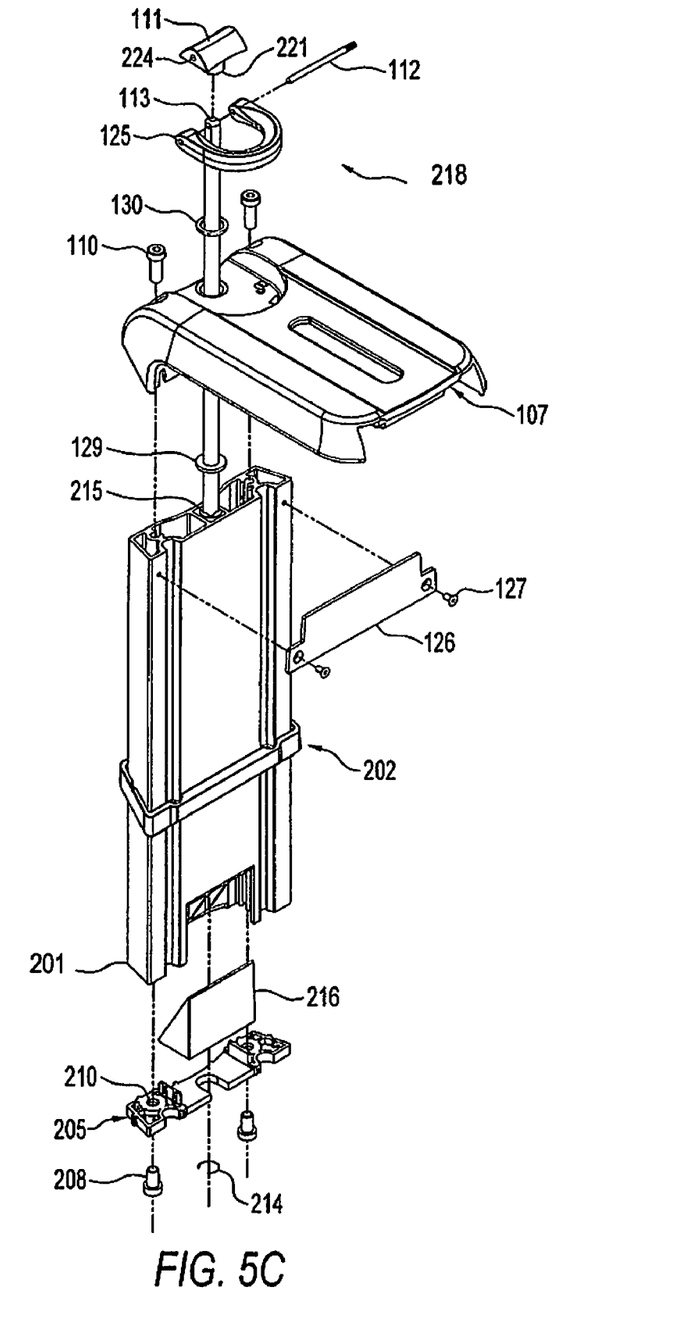
FIG. 5(c) is an exploded view of an embodiment of a vertical assembly of the present invention.
Figure 9A:
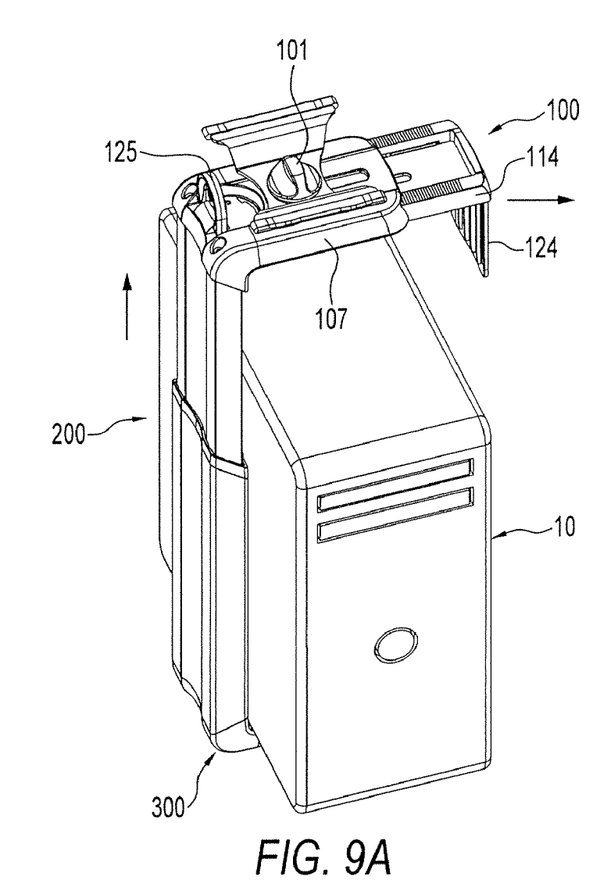

Referring now to the embodiments shown in FIGS. 5(c) and 8, vertical assembly 200 includes long screw 113, handle assembly 218, inner extrusion 201, inner extrusion cap 205, extrusion sleeve 202, outer extrusion 203, stopper assembly 219 and base assembly 300. Handle assembly 218 comprises handle base 111, handle 125, handle washer 130, handle pin 112 and long screw washer 129. Handle base 111 is preferably T-shaped with longitudinal portion 221, which inserts through bore 176 of horizontal platform 107. Handle base 111 includes a lateral bore for handle pin 112 and longitudinal bore for long screw 113. Long screw 113 is preferably about 300 millimeters (300 mm) in length with 50 millimeters (50 mm) of thread, with top end 223 fixedly attached to handle base 111 by any means known in the art, and with bottom end 230 fixedly attached to stopper assembly 219, as described below. Long screw 113 includes threading to operably engage washer 129, e-style retaining ring 214, and stopper assembly 219. Long screw 113 further includes small bore 224 near top end 223 for insertion of handle pin 112 perpendicularly through the top portion of long screw 113. Handle 125 is preferably a loop-style handle adapted to be grasped, pulled or turned by a user using one hand. Handle washer 130 supports handle base 111 in operable engagement with horizontal platform 107. Handle pin 112 attaches handle 125 to handle base 111 and inserts through long screw 113, which allows handle 125 to rotate about pin 112 and to turn long screw 113 clockwise or counterclockwise when in the upright position. Long screw washer 129 and e-style retaining ring 215 supports long screw 113 and handle base 111 in operable engagement with inner extrusion 201. Handle assembly 218 and the upper portion of vertical assembly are best shown in exploded view in FIG. 5(c) and in cross-section in FIG. 8. As assembled, as best shown in FIG. 9(a), handle 125 is located in proximity to swivel knob 101 such that the time it takes for a user to install a computer component utilizing the present invention is reduced compared to traditional methods of installation and such that a user may quickly and efficiently adjust both the vertical and horizontal dimensions of the present invention.

Inner extrusion 201 may be preferably extruded from metal, such as aluminum, or plastic, but may be cast or formed by any method known in the art. Inner extrusion preferably measures about 270 millimeters (270 mm) in length, about 22 millimeters (22 mm) in width and about 105 millimeters (105 mm) in depth. It should be understood by those skilled in the art that these dimensions are provided by way of example only, and the present invention could be manufactured with differing dimensions to achieve the same functionality. In some embodiments, inner extrusion 201 may be fabricated with the cross-section profile shown in FIG. 5(b). Inner extrusion 201 includes bores 213 for attachment of screws 110, 208 and bores 217 for alignment within outer extrusion 203.

Preferably, two bores 213 continuously span the length of inner extrusion 201, and present threading at ends to receive screws 110 (as shown in FIG. 3), 208 (as shown in FIG. 5(a)) for operable engagement therewith. In this manner, inner extrusion 201 may be fixedly attached to horizontal platform 107 by operable engagement of screws 110 with bores 213 (as shown in FIG. 8), and inner extrusion 201 may be fixedly attached to inner extrusion cap 205 by operable engagement of screws 208 with bores 213 (as shown in FIG. 5(a)). Preferably, bores 217 also continuously span the length of inner extrusion 201 for operable engagement with outer extrusion 203 when assembled. As shown in the embodiment shown in FIG. 5(a), inner extrusion cap 205 braces the bottom face of inner extrusion 201 such that inner extrusion cap 205 is retained by extrusion sleeve 202 when inner extrusion 201 is extended fully from outer extrusion 203. Inner extrusion cap 205 preferably may be made of plastic and preferably includes bore 228 for insertion of bottom end 230 of long screw 113 when assembled and bores 210 for insertion of screws 208 to operably engage slots 213 of inner extrusion 201.

Figure 4:
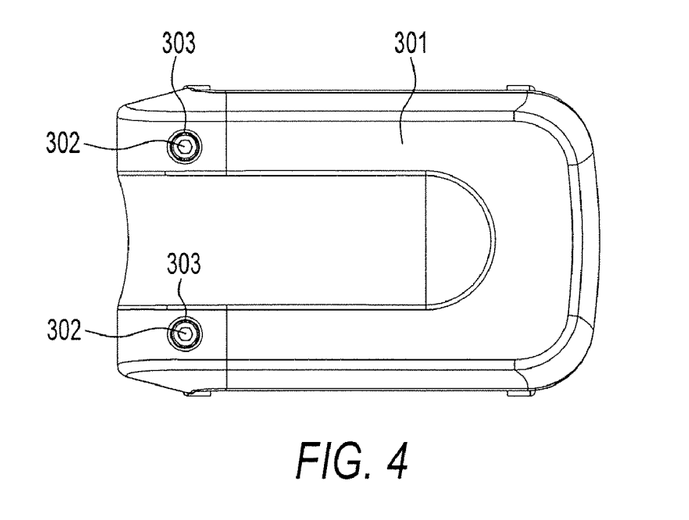
FIG. 4 is a bottom view of an embodiment of the present invention.

Outer extrusion 203 preferably may be extruded from metal, such as aluminum, or plastic, but may be cast or formed by any method known in the art. Outer extrusion 203 preferably measures approximately 300 millimeters (300 mm) in length, 30 millimeters (30 mm) in width and 115 millimeters (115 mm) in depth, with a slight taper inward toward inner extrusion such that stopper assembly 219 effective immobilizes inner extrusion 201 and outer extrusion 203 in operation. It should be understood by those skilled in the art that these dimensions are provided by way of example only, and the present invention could be manufactured with differing dimensions to achieve the same functionality. In some embodiments, outer extrusion 203 may be fabricated with the cross-section profile shown in FIGS. 5(a) and 5(b). Outer extrusion 203 includes bores 226 for attachment of screws 211 (as shown in FIG. 2), 302 (as shown in FIG. 4). Preferably, two bores 226 continuously span the length of outer extrusion 203, and present threading at ends to receive screws 211 (see FIG. 2), 302 (see FIG. 4) for operable engagement therewith. In this manner, outer extrusion 203 may be fixedly attached to extrusion sleeve 202 by operable engagement of screws 211 with bores 226. Bores 226 further align with bores 217 of inner extrusion 201 to operably engage inner extrusion 201 when assembled, as shown in FIG. 5(b). Outer extrusion 203 may also be fixedly attached to base cap 301 by operable engagement of screws 302 with bores 226 (as shown in FIG. 4). Referring now to the embodiment shown in FIG. 2, extrusion sleeve 202 caps the top face of outer extrusion 203 such that inner extrusion cap 205 is retained by extrusion sleeve 202 when inner extrusion 201 is extended fully from outer extrusion 203. Extrusion sleeve 202 preferably may be made of plastic and includes bores 229 for attachment of outer extrusion 203 by operable engagement with screws 211.

Referring now to the embodiment shown in FIG. 8, stopper assembly 219 includes stopper wedge 206, stopper wedge insert 216, and e-style retaining ring 214. Stopper wedge 206 is shaped to wedge upward between inner extrusion 201 and outer extrusion 203 as long screw 113 is turned clockwise by handle 125. Stopper wedge 206 preferably may be made from plastic or elastomer (i.e. foam) and preferably is sized to fit the bottom portion of inner extrusion 201 with an incline of about 30 degrees and with a height of about 38 millimeters (38 mm). Stopper wedge 206 includes stopper wedge insert 216 for operable engagement with long screw 113. Stopper wedge insert 216 includes threaded bore 227. Long screw 113 spans the length of inner extrusion 201, inserts through stopper wedge 206, threads through stopper wedge insert 216, inserts through bore 228 of inner extrusion cap 205, and is retained by e-style retaining ring 214.

Referring again to the embodiment shown in FIG. 2, base assembly 300 comprises base cap 301 and foam base 304. Base cap 301 may include a plurality of internal ribs 306 that may facilitate the molding of base cap 301 and provide sufficient structural strength. Base cap 301 includes slots 303. Base cap 301 may be fixedly attached to outer extrusion 203 by operable engagement of screws 302 through slots 303 for mating with bores 226 of outer extrusion 203 (as shown in FIG. 4). Referring to FIG. 2, the bottom surface of foam base 304 may accommodate internal ribs 306, and may be attached by any means known in the art, including adhesive, pins and the like. Although commercially available thermoplastic rubber may be used for foam base 304, any type of elastomer or rubberlike substance known in the art that would protect the computer component from the mounting system may be used.

Referring now to the embodiment shown in FIG. 2, in order to assembly vertical assembly 201, extrusion sleeve 202 may be fixedly attached to the top of outer extrusion 203 by operable engagement of screws 211 through bores 229 of extrusion sleeve 202 for mating with bores 226 of outer extrusion 203. Inner extrusion 201 may then be slid into outer extrusion 203, using bores 217, 212 for proper alignment. Once slidably inserted, inner extrusion cap 205 may be fixedly attached to the bottom face of inner extrusion 201 by inserting screws 208 through slots 210 of inner extrusion cap 205 for operable engagement with bores 213 of inner extrusion 201. The top of inner extrusion 201 may then be fixedly attached to horizontal assembly 200 by inserting screws 110 through slots 109 of horizontal platform 107 for operable engagement with bores 213 of inner extrusion 201. Handle assembly 218 and long screw 113 may then be inserted through bore 176 of horizontal platform 107. Long screw 113 spans the length of inner extrusion 201, inserts through stopper wedge 206, threads through stopper wedge insert 216, inserts through bore 228 of inner extrusion cap 205, and is retained by e-style retaining ring 214. Base assembly 300 may then be fixedly attached to outer extrusion 203 by operable engagement of screws 302 through slots 303 for mating with bores 226 of outer extrusion 203.

Once fully assembled, the computer component mounting system described herein provides a simple and efficient apparatus for securing a computer component to a surface. In operation, a user turns swivel knob 101 counterclockwise to loosen horizontal assembly 100. The user may then grasp gripping edge 124 and pull forward to a width greater than a horizontal dimension of the computer component to be mounted. Handle 125 may then be rotated upward from recession handle portion 156, and turned counterclockwise to unthread long screw 113 from threaded bore 227 of stopper wedge insert 216. Through this operation, stopper wedge 206 contracts from outer extrusion 203, which permits axial movement of inner extrusion 201 relative to outer extrusion 203. The user may then pull handle 125 upward to extend inner extrusion 201 such that horizontal assembly 100 rests at a height greater than a vertical dimension of the computer component to be mounted. The user may then place the computer component on foam base 304 with its vertical dimension aligned with vertical assembly 200. The user may grasp handle 125 and push downward to lower inner extrusion 201 until foam layer 169 of clamp plate assembly 168 engages with the top surface of the computer component. The user then turns handle 125 clockwise to thread long screw 113 into threaded bore 227 of stopper wedge insert 216, which laterally shifts inner extrusion 201 and stopper wedge 106 into contact with outer extrusion 203 to immobilize inner extrusion 201 and outer extrusion 203 relative to each other. Once the vertical assembly has been set in this manner, the user may then slide gripping edge 124 toward the computer component until it engages the side surface of the computer component. The user may then turn swivel knob 101 clockwise to tighten clamp plate assembly 168 such that foam layer 169 compresses to the top of the computer component.

As described above, handle 125 is located in proximity to swivel knob 101 such that the time spent by a user to engage slider grip assembly 151 against the forward surface of computer component 10 and to engage clamp plate assembly 148 against the proximate surface of the computer component 10, both by turning swivel knob 101, and to turn long screw 113 to adjust a position of stopper wedge 206 within inner extrusion 101 and outer extrusion 103 and to substantially immobilize inner extrusion 101 and outer extrusion 103 relative to each other may be reduced.

Figure 9B:
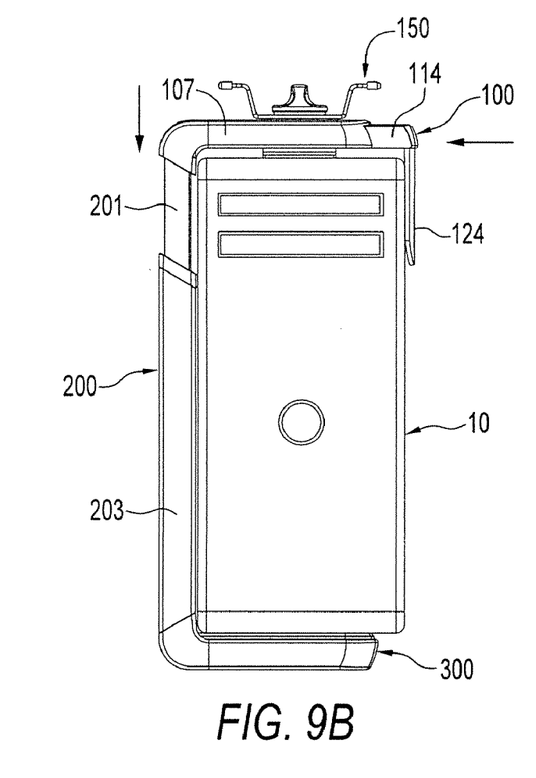

As show in FIGS. 9(*a*) (with horizontal assembly 100 and vertical assembly 200 loosened) and 9(*b*) (with horizontal assembly 100 and vertical assembly 200 tightened), computer component 10 is securely embraced by the mounting system. In order to mount the system to the underside of a desk, or any other suitable surface, wings 177, 178 of mounting structure 150 may be positioned onto a double-railed track or bracket, as is well known in the art. Once mounted in this manner, the computer component mounting system of the present invention is adapted to swivel 360 degrees around swivel knob 101 by virtue of swivel guide plate 104. Swivel guide plate wings 177, 178 may be inserted into tracks mounted onto the surface. In other embodiments, swivel guide plate 104 may be adapted to mount directly to a surface in any manner known in the art.

In some embodiments, the users of such computer component mounting systems may desire to lock the installment of computer components, due to the expense of such components. Locking mechanisms, whether by key, security code, or otherwise, are well known in the art, and may be easily integrated into mounting structure 150, the handle assembly 218, clamp plate assembly 168 or swivel knob assembly 152 such that the computer component may be locked into the system for unlocking only by authorized personnel.

The above description discloses several embodiments of the present invention. Many modifications to the invention could be made beyond those modifications already described. Those skilled in the art will recognize that many variations, modifications or optional features could be made without departing from the basic inventive concept. For instance, although dimensions are provided for several components, it should be understood that dimensions may be included for illustrative purposes only, and do not in any way limit the claims or the scope of the present invention. All such variations, modifications, and/or optional features are intended to come within the scope of the following claims.

What is claimed is:

1. A computer component mounting system comprising:
   a. a vertical assembly which adjusts vertically to a first dimension of a computer component, the vertical assembly comprising an outer extrusion, an inner extrusion, the inner extrusion slidably engaged within the outer extrusion;
   b. a stopper for substantially immobilizing the inner and outer extrusions relative to each other, the stopper comprising a wedge, the wedge operably engaged between the inner extrusion and the outer extrusion, and a long screw, the long screw threadably engaged with the wedge;
   c. a base for stabilizing the computer component, the base rigidly attached to a distal end of the outer extrusion; and
   d. a mounting means to secure the computer component mounting system to a surface, the mounting means attached to the vertical assembly.

2. The computer component mounting system of claim 1 wherein the long screw has a first end and a second end and being threadably engaged with the wedge at the first end, such that when the long screw is turned in a first direction, the wedge moves upward and lodges between the inner and outer extrusions to substantially immobilize the inner and outer extrusions relative to each other, and when the long screw is turned in a second direction, the wedge moves downward and dislodges to allow the inner and outer extrusions to slide relative to each other.

3. The computer component mounting system of claim 1 wherein the long screw further comprises a handle connected to the second end of the long screw to facilitate turning the long screw.

4. The computer component mounting system of claim 1 further comprising a horizontal assembly which adjusts horizontally to a second dimension of the computer component.

5. The computer component mounting system of claim 4 wherein the horizontal assembly comprises a horizontal platform, a slider grip assembly, and a swivel knob, wherein the swivel knob operably engages the horizontal platform and the slider grip assembly such that the slider grip assembly may be adjusted outwardly and inwardly from the horizontal platform to engage at least one surface of the computer component.

6. The computer component mounting system of claim 5 wherein the slider grip assembly comprises a slider platform operably engaged with a gripping edge such that the gripping edge protrudes perpendicularly from the slider platform and slides outwardly and inwardly relative to the horizontal platform to engage a surface of the computer component.

7. The computer component mounting system of claim 6 wherein the slider grip assembly further comprises a clamp plate assembly, the clamp plate assembly operably engaged with the slider platform and the swivel knob such that turning the swivel knob in a first direction lowers and removably compresses the clamp plate assembly against the proximate surface of the computer component while simultaneously substantially immobilizing the slider platform and the horizontal platform relative to each other such that the gripping edge removably engages the surface of the computer component.

8. The computer component mounting system of claim 7 wherein the clamp plate assembly comprises at least one elastomer layer to removably compress against the proximate surface of the computer component.

9. The computer component mounting system of claim 7 wherein the slider platform comprises a slot, wherein the horizontal platform comprises a slot, wherein the swivel knob comprises a rod and a knob handle engaged with a first end of the rod, wherein a second end of the rod inserts through the slot in the horizontal platform, through the slot in the slider platform and engages with the clamp plate assembly.

10. The computer component mounting system of claim 9 wherein the rod is operably engaged within the slot of the slider platform and the slot of the horizontal platform such that the rod may slide the length of the slot of the slider platform to adjust the horizontal assembly to the second dimension of the computer component.

11. The computer component mounting system of claim 5 wherein the mounting means comprises a swivel guide plate engaged with the horizontal assembly, the swivel guide plate adapted for mounting upon a mounting track on a surface.

12. A computer component mounting system of claim 11 wherein the swivel guide plate comprises a slot, and wherein the rod of the swivel knob inserts through the slot and engages the horizontal assembly.

13. The computer component mounting system of claim 5 wherein the long screw operably engages the horizontal platform such that the horizontal assembly and the vertical assembly operate as an integrated unit.

14. The computer component mounting system of claim 13 wherein the long screw operably engages the horizontal platform at a position near the swivel knob.

15. The computer component mounting system of claim 4 wherein the inner extrusion comprises a distal end, the outer extrusion comprises a distal end, the horizontal assembly is rigidly attached to the distal end of the inner extrusion and wherein the base comprises a second horizontal assembly rigidly attached to the distal end of the outer extrusion and adapted to adjust horizontally to the same dimension of the computer component, such that the computer component is engaged on three surfaces by the horizontal assembly, the vertical assembly and the second horizontal assembly, respectively.

16. The computer component mounting system of claim 15 wherein the mounting means comprises a swivel guide plate engaged with the horizontal assembly, the swivel guide plate adapted for mounting upon a mounting track on a surface.

17. The computer component mounting system of claim 15 wherein the mounting means comprises a swivel guide plate engaged with the vertical assembly, the swivel guide plate adapted for mounting upon a mounting track on a surface.

18. A method for installing a computer component in a mounting system comprising the steps of (a) loosening a swivel knob; (b) sliding a slider grip assembly outward to a dimension longer than a first dimension of the computer component; (c) releasing a stopper; (d) sliding an inner extrusion upward to a dimension greater than a second dimension of the computer component; (e) placing the computer component with one surface upon a base, the base rigidly engaged with a distal end of an outer extrusion to stabilize the computer component; (f) lowering the inner extrusion relative to the base until a horizontal platform engages a proximate surface of the computer component; (g) tightening the stopper by turning a long screw to lodge a wedge between the inner and outer extrusions; (h) sliding the slider grip assembly inward to engage a forward surface of the computer component; (i) tightening the swivel knob to secure the computer component within the mounting system; (j) securing a swivel guide plate onto a mounted rail.

19. The method of claim 18 wherein the swivel knob operably engages the horizontal platform and the slider grip assembly such that loosening the swivel knob permits the slider grip assembly to slide outward from the horizontal platform.

20. The method of claim 18 wherein the long screw is threadably engaged with the wedge.

21. The method of claim 18 wherein turning the long screw further compromises turning the long screw clockwise.

22. The method of claim 18 further comprising the step of (k) centering the swivel guide plate above the computer component, the swivel guide plate operably engaged with the horizontal platform and comprising one or more flanges for sliding along the mounted rail.

* * * * *